April 15, 1930.  A. W. COCHRAN ET AL  1,754,460
COMBINED MATRIX FORMER AND DRIER
Filed Aug. 4, 1927    6 Sheets-Sheet 2

Inventors:
Albert W. Cochran
Henry W. Dewey
by J. J. Geisler
Attorney

April 15, 1930.  A. W. COCHRAN ET AL  1,754,460
COMBINED MATRIX FORMER AND DRIER
Filed Aug. 4, 1927    6 Sheets-Sheet 3
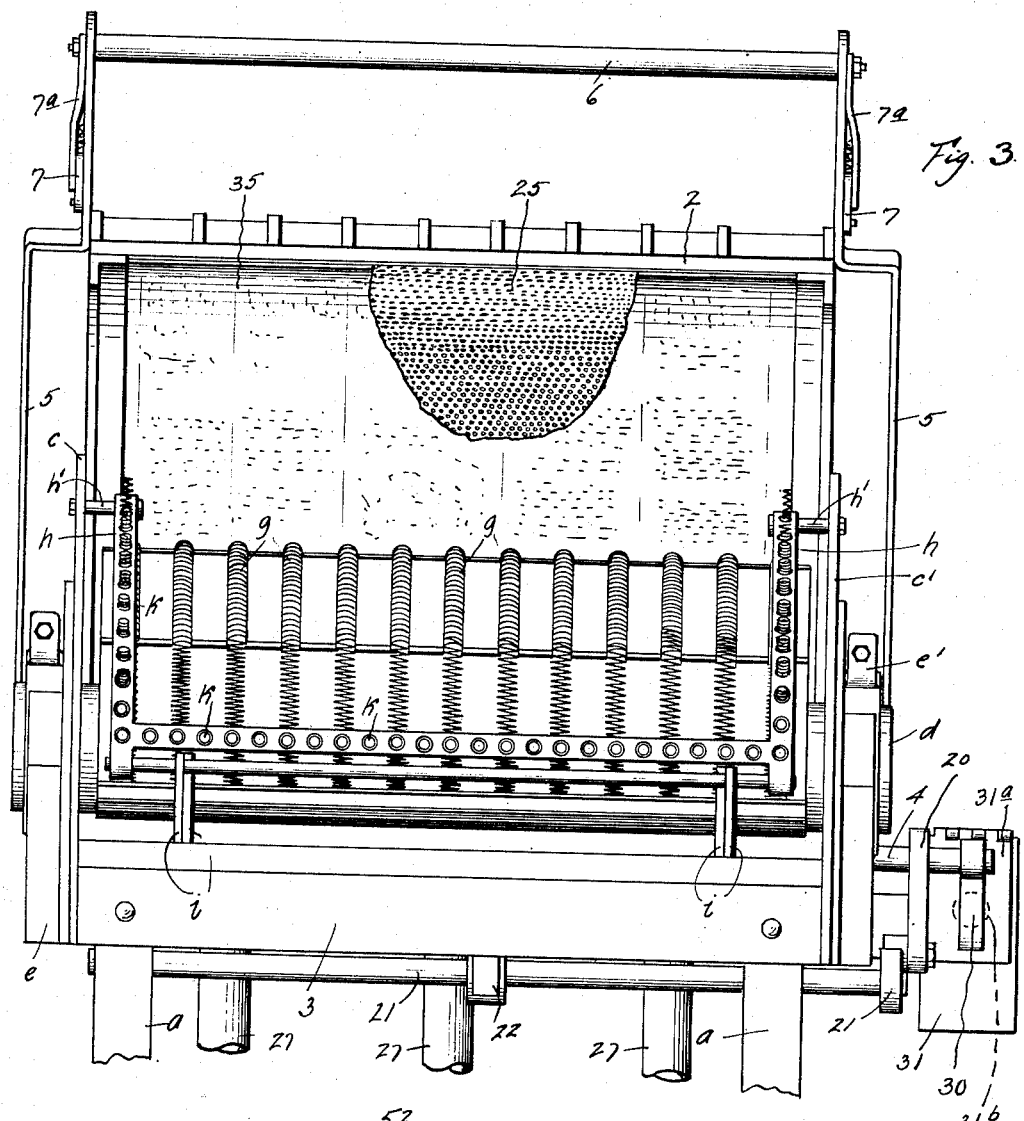
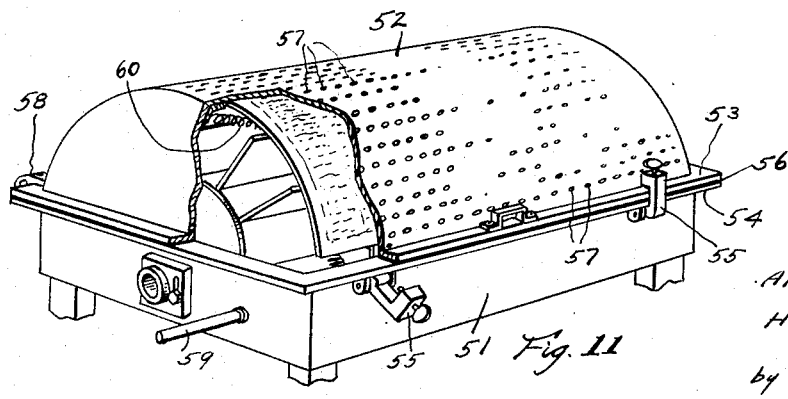

April 15, 1930.   A. W. COCHRAN ET AL   1,754,460
COMBINED MATRIX FORMER AND DRIER
Filed Aug. 4, 1927   6 Sheets-Sheet 4
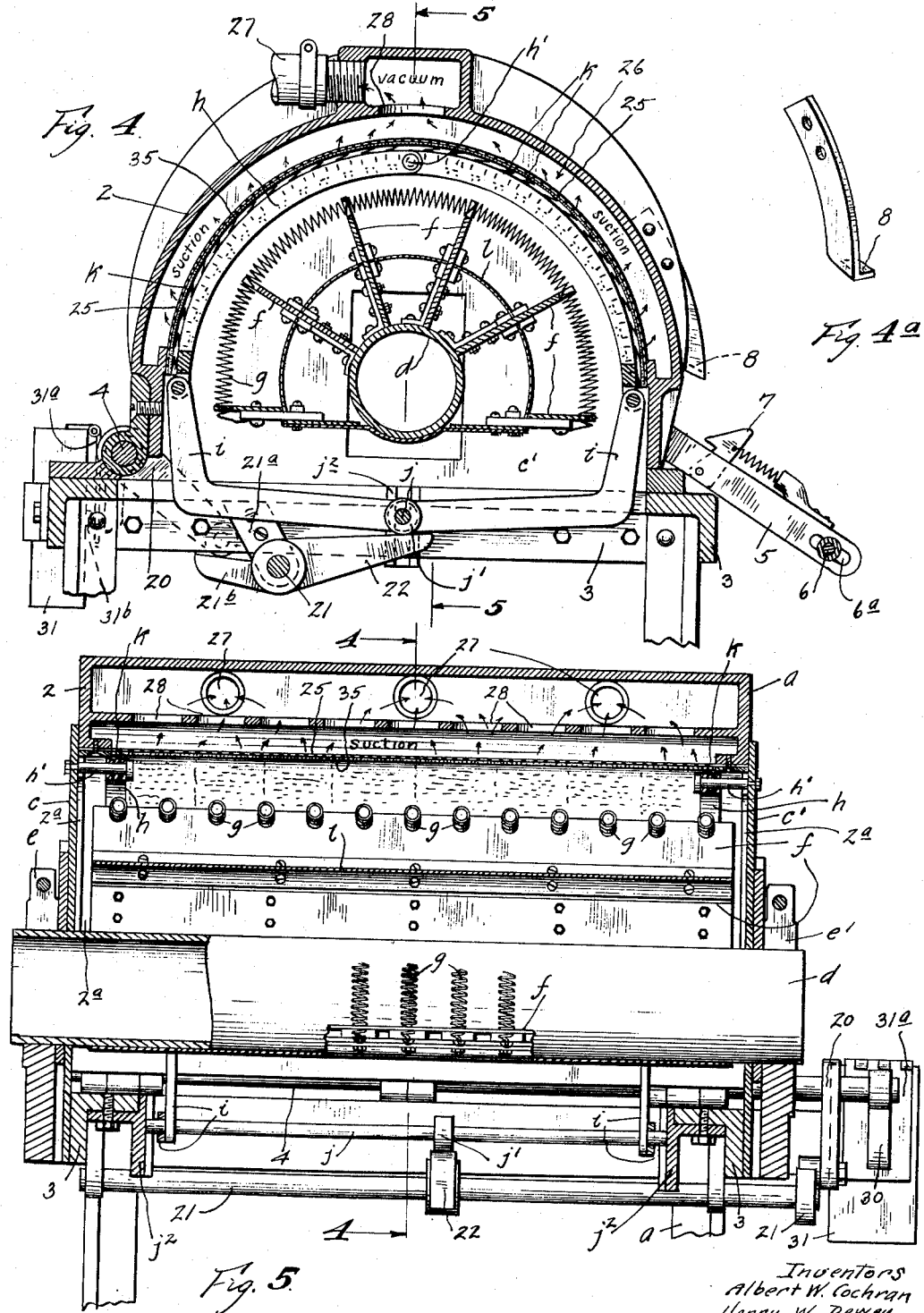
Inventors
Albert W. Cochran
Henry W. Dewey
by J. Geisler
Atty April 15, 1930.　　A. W. COCHRAN ET AL　　1,754,460
COMBINED MATRIX FORMER AND DRIER
Filed Aug. 4, 1927　　6 Sheets-Sheet 5

Inventors:
Albert W. Cochran
Henry W. Dewey
by T. J. Geisler
Atty.

Patented Apr. 15, 1930

1,754,460

UNITED STATES PATENT OFFICE

ALBERT W. COCHRAN AND HENRY W. DEWEY, OF PORTLAND, OREGON

COMBINED MATRIX FORMER AND DRIER

Application filed August 4, 1927. Serial No. 210,681.

Our invention relates to the use of so called "dry mats" or matrices for the making of stereotypes.

As well known, printing of any matter in mass, for example, newspapers, is done by stereotype plates, obtained by making a paper matrix. Since presses used for newspaper purpose are commonly cylindrical, the matrix for the stereotype must be correspondingly curved. Further, since the matrix is moist and speed is fundamental to newspaper work, the matrix has to be dried in a suitable heater.

In the heater heretofore commonly in use, the matrix was placed merely loosely, no means being provided for the holding of the matrix firmly to an even true surface. In consequence the matrix tended to buckle and warp, and the latter produced "white spots" in printing. To prevent this the warps had to be worked out by hand, a time consuming labor, frequently not successful so that the matrix had to be thrown away. But on the other hand pressing the matrix between opposing, non-yielding firm surfaces would tend to break down the raised surfaces, or "spaces", about the indentures of the matrix, and spoil it.

Hence the primary object of our invention is to prevent the buckling and warping of the matrix by supporting it firmly on an even true surface in the heater during the drying process, without applying any degree of pressure, tending to break down the raised surfaces or spaces about the indentures or spaces.

We attain this object by holding the matrix firmly by pneumatic pressure against an even surface of the proper form in the drier during the drying period, and limiting the amount of pressure to that which the matrix can safely stand without depressing the "spaces."

Preferably we obtain the desired pressure by providing a hollow perforated surface, creating a vacuum in the hollow and holding the matrix against such surface by suction. The suction so applied incidentally promotes the drying of the matrix.

Holding the matrix firmly in place by suction is further preferable, in our opinion, because the inner or indented face of the matrix is usually close grained, or if not is covered with clay to insure a smooth printing plate, while the back of the matrix always presents, more or less, open pores through which the moisture in the matrix may be readily withdrawn.

Another advantage of our invention is, it furnishes a control of the shinkage of the matrix. Shrinkage is very desirable since it produces a smaller stereotype, and reduces in that way appreciably the amount of paper required for printing. The degree of shrinkage depends upon the amount of moisture in the matrix, and this in turn has direct bearing on the tendency of the matrix to buckle, and on the time required for drying. By our improved method of using a vacuum to hold the back of the matrix firmly against an even true surface while being dried, we not only prevent buckling and warping, but also speed the drying process, thus enabling us to use a greater amount of moisture in the matrix, and to obtain maximum shrinkage without detrimental effects.

It is, however, difficult to obtain an efficient vacuum without holding the perimeter margins of the matrix firmly against the suction surface; at the same time the matrix must not be held so rigidly as to tend to resist shrinkage.

Furthermore, by means of a high vacuum we are enabled to hold the matrix so firmly against a true even surface as to prevent shrinkage. Such result may be desirable in forming a matrix for color work. Hence, as stated, by the application of vacuum we control the shrinking of the matrix.

The second feature of our invention, therefore, consists in holding the matrix firmly at its perimeter margins against the suction surface by means exerting a yielding pressure; in other words the holding means for the margins of the matrix are adapted to permit slippage under the holding devices in response to the shrinkage of the matrix. Preferably we employ for said yielding holding means a series of resilient pressure exerting elements, for example coiled springs, arranged to bear on the margins of the perimeter of the matrix; these elements incidentally permit the heat to extend to the margins of the matrix, and thus facilitate the drying of those parts in unison with the rest of the matrix; otherwise more or less warps will occur at the margins of the matrix, which gives trouble in casting the stereotype plate, tending to permit metal to run under the raised surfaces.

A further feature of our invention is, the described matrix holding means which are located in the cover of the drier, and the said pressure exerting elements are thrown into and out of action by the closing and opening of the cover. Incidentally the heating element within the drier is turned on and off with the closing and opening of the cover, so that an interval intervenes before the heating element, or the full force thereof, is applied to the matrix; this prevents the application of the heat too rapidly. The suction however is applied constantly, and so when the cover is closed the vacuum and heating cooperate to effect the drying of the mat.

Other features of our invention, the construction of our drier and its mode of operation is hereinafter fully described with reference to the accompanying drawings, in which:

Fig. 3 shows a fragmentary enlarged front elevation of our invention with the cover raised, and a matrix in position in the cover, a portion of the matrix being broken away to disclose the perforated interior wall of the cover;

Fig. 4 shows a section taken on the line 4—4 of Fig. 5 looking in the direction of the arrows, and illustrates the relative position of the heating elements, matrix, and a vacuum chamber;

Figure 6:
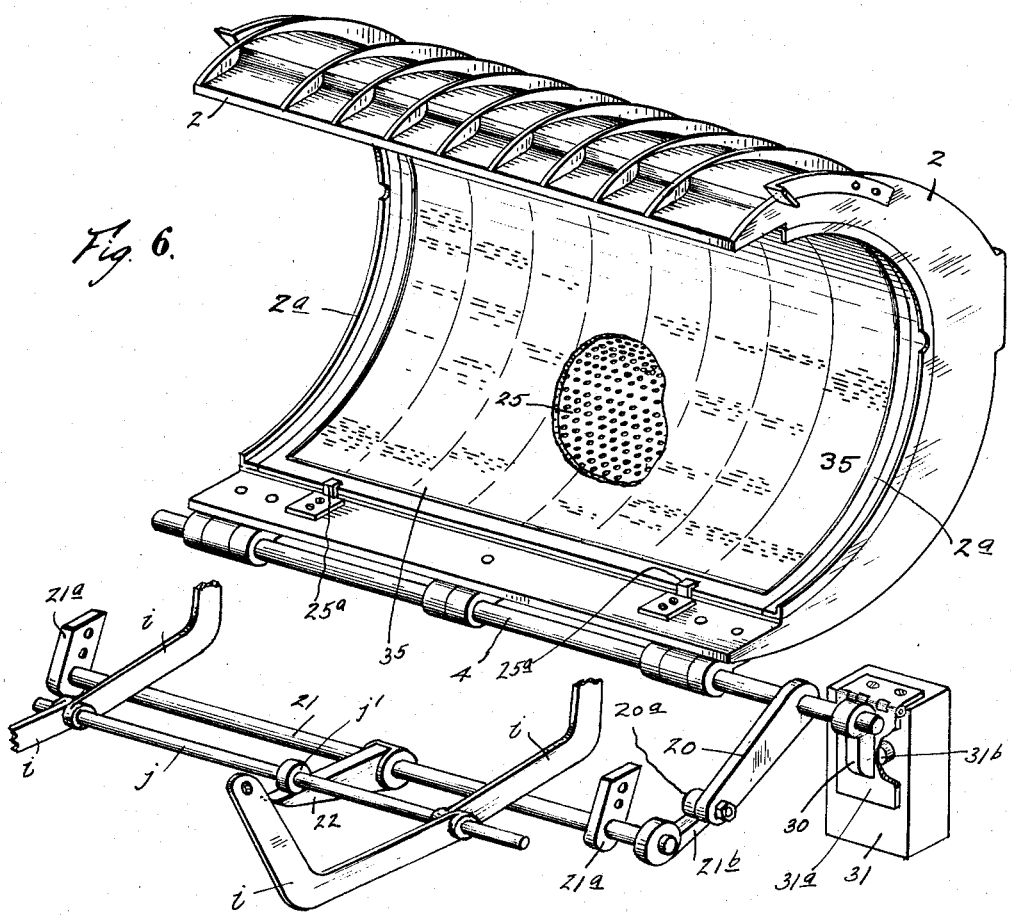
Figure 7:
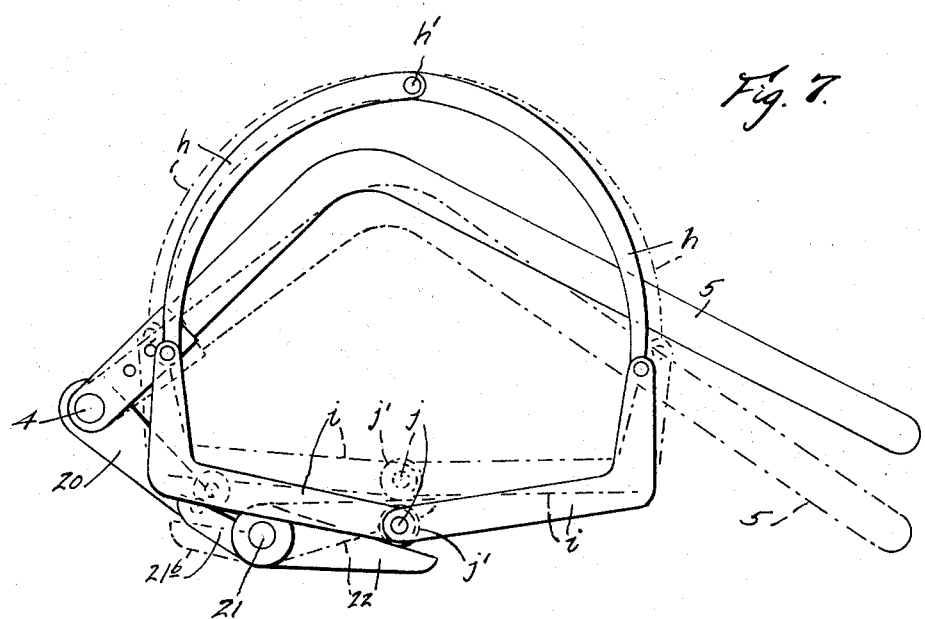
Figures 8, 9:
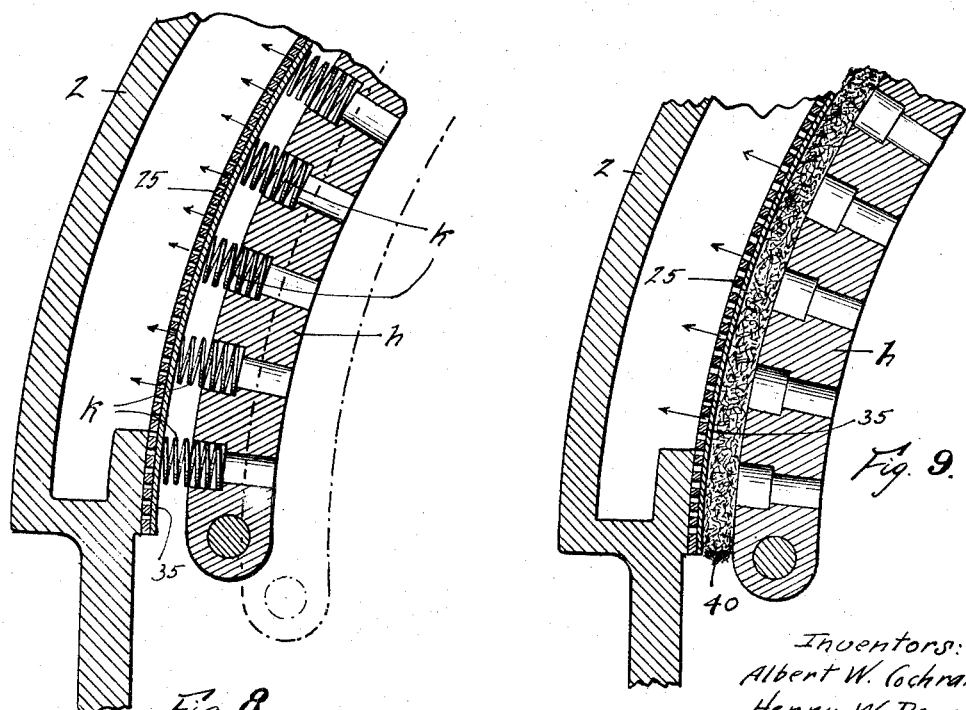

Fig. 4ª shows a perspective view of one of the catches provided on the forward edge of the cover, on which the dogs on the operating lever are engaged;

Fig. 5 shows a section taken on the line 5—5 of Fig. 4 and illustrates further details of construction;

Fig. 6 shows a perspective view of the cover in a raised position, and the levers which operate the pressure arms, and illustrates the operative connection of the shaft with the switch in the electric heating element;

Fig. 7 shows, diagrammatically, the pressure arms and the operating lever thereof, and illustrates in full and broken lines how the said pressure arms are moved outward against the perimeter margins of the matrix and retracted again;

Fig. 8 shows an enlarged fragmentary section of said pressure arms, and the pressure-exerting springs carried by said pressure arms; the latter being shown in their active or pressure applying position and further illustrates by broken lines, the said pressure arm moved away from the matrix, when placing the pressure arms in their inactive position; and Fig. 9 shows a section similar to Fig. 8 and illustrates the use of steel wool as a substitute for the pressure applying coil springs shown in Fig. 8.

Figure 10:
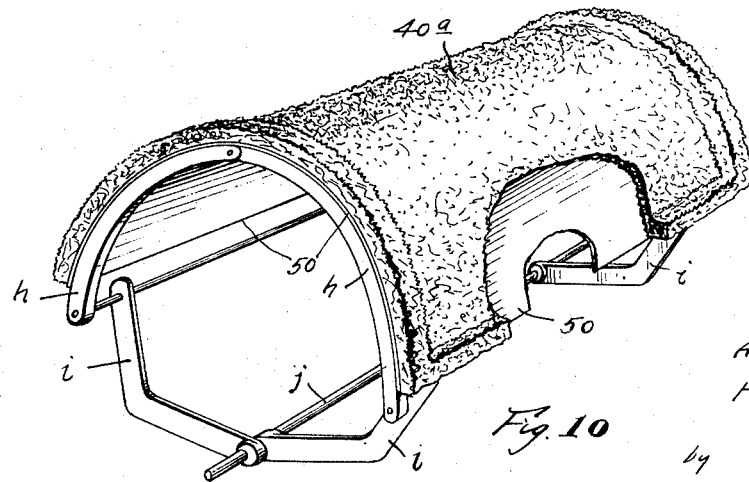

Figures 10 and 11 represent modifications which can be made in the construction of our drier as hereinafter fully described.

Referring now to Figs. 1 to 8, inclusive, our invention comprises a supporting frame $a$ mounted upon a suitable foundation $b$ and two spaced semi-circular companion plates $c$ and $c'$ are mounted on the base 3 of the frame. A hollow shaft $d$ of substantial diameter is centrally mounted for limited vertical movement in the plates $c$ and $c'$, in plates $e$ and $e'$ which are adjustably bolted on the outside of the plates $c$ and $c'$ respectively, in slots $e^2$ and $e^3$ thereby providing vertical adjustment of the hollow shaft $d$.

Transverse radial members $f$ are arranged on the shaft $d$ which extend outwardly less than the radius of the plates $c$ and $c'$.

A number of electrical heating elements $g$ are circumferentially arranged over the members $f$ and are connected by suitable means to a switch provided in their circuits, hereinafter described and by means of the limited vertical adjustment of the hollow shaft $d$, the electrical heating elements may be moved to and from the matrix to be dried.

A reflector surface 1 is arranged concentrically within the heating elements and is supported on the radial supports $f$.

Two semi-circular pressure arms $h$ are mounted at each side of our oven, spaced inwardly and extending longitudinally along the front and back of our oven from the side walls 2ª—2ª of the cover 2, so as to form a support for the coiled springs $k$, which hold the perimeter margins of the matrix firmly against the perforated interior wall 25 of the cover.

The pressure arms $h$ consist of two sections hinged together at the middle as at $h'$, the hinge pins projecting from the inner sides of the plates $c$ and $c'$. The lower free ends of the pressure arms $h$, are pivotally connected to angular arms $i, i$, the inner ends of which are pivotally supported on a transverse rod $j$, on the projecting ends of which are mounted cam rollers $j'$.

On the upper surfaces of the pressure arms $h$ are mounted open coil-springs $k$.

A semi-circular cover 2 is hingedly mounted on the frame member 3 by a shaft 4, and fits closely between the interior faces of the said plates c and c' thus forming more or less a seal with said sides. On the extremities of the shaft 4 are mounted operating levers 5. These operating levers extend parallel with the plates c and c', beyond the frame, and are connected at their free ends by a handle bar 6. Spring controlled latch dogs 7 are provided on the said operating levers 5 adjacent their outer ends, which latch dogs are adapted to engage catches 8 on the outside of the cover 2. The latch dogs are engaged and released by the movement of the handle bar 6 towards and from the operator, such movement being accommodated by the slots 6ª in the operating levers 5.

Figure 1:
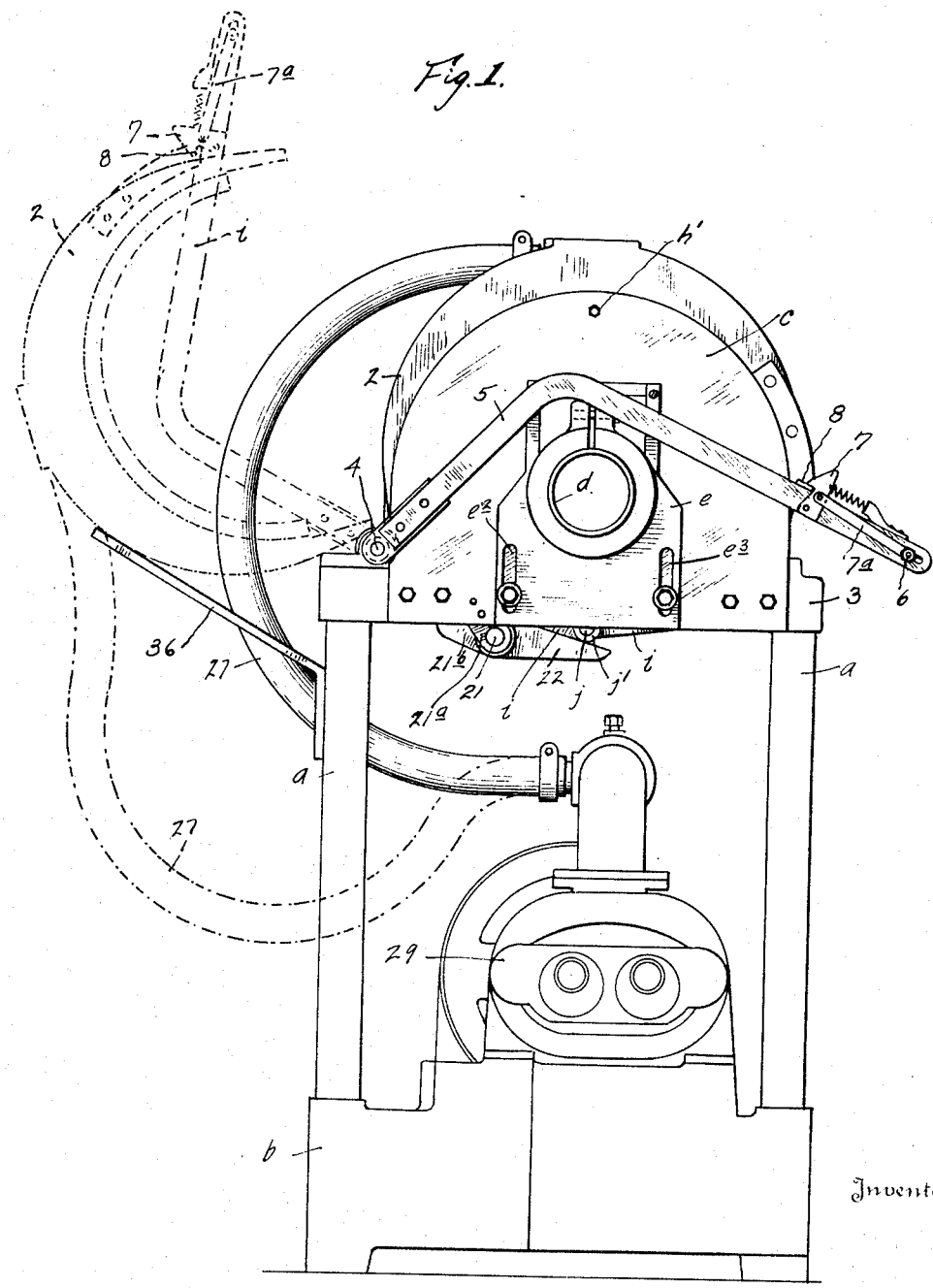
Fig. 1 shows a side elevation of our combined matrix former and drier and illustrates by broken lines the cover in a raised or open position.
Figure 2:
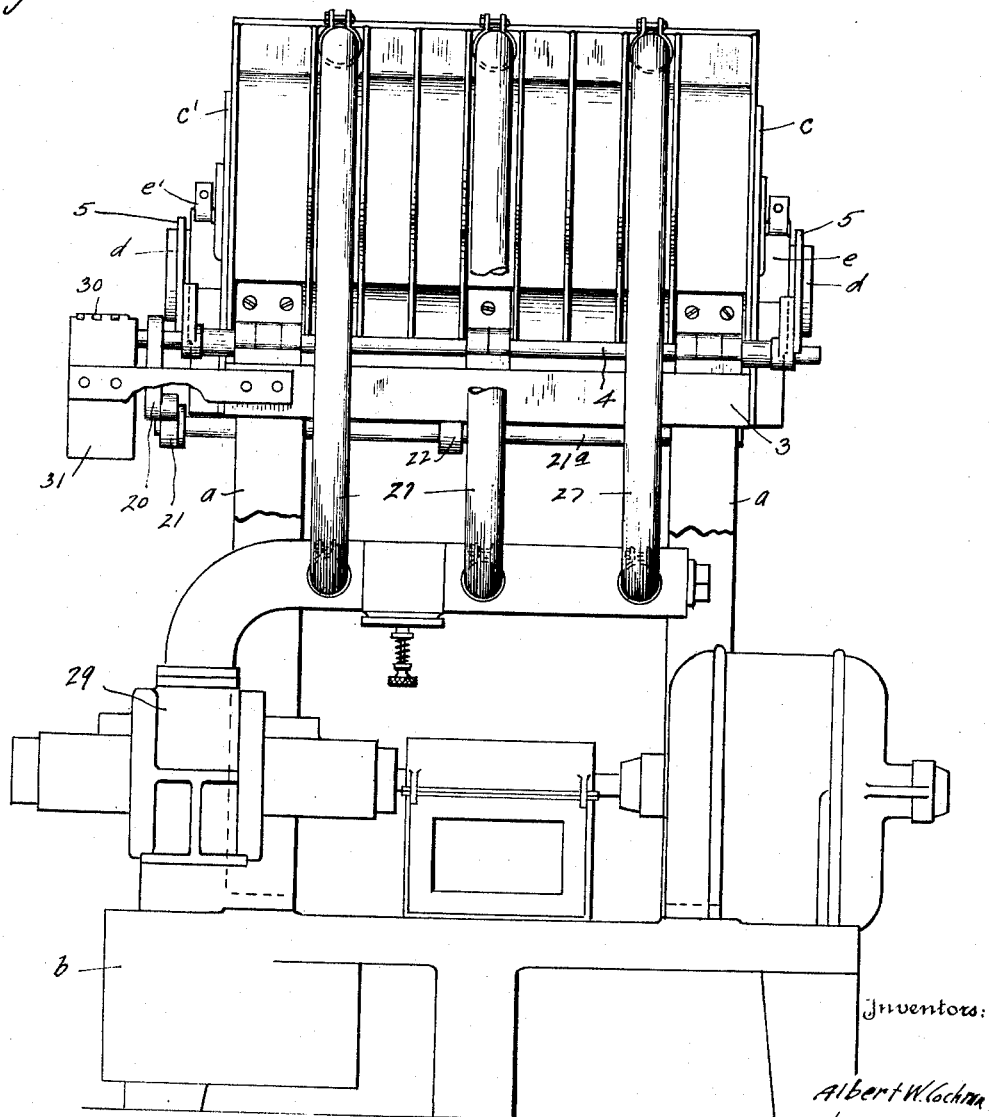
Fig. 2 shows a rear elevation of our invention with the cover in closed position and illustrates certain details of construction, hereinafter described.

The levers 5 are curved as shown in Fig. 1 in order not to interfere when operated, with the shaft d.

An arm 20 is fixed on one end of the shaft 4. A rock shaft 21 is mounted in bearings 21ª provided on the inner faces of the ends of the frame member 3. On the shaft 21 is mounted an arm 21ᵇ, on which bears the roller 20ª carried by the arm 20. On the shaft 21 is mounted a cam-arm 22, which bears against the cam roller j', on the rod j, on which the angular arms i are pivotally mounted. The ends of the rod j bear in guides j².

The cover 2 is hollow as shown by 26 in Fig. 4. The interior wall 25 of the cover is perforated. The cover 2 is connected by flexible conduits 27 through ports 28, with vacuum creating means 29, preferably an electrically driven vacuum pump on the foundation b, of the frame a. The vacuum creating means are operated continuously, while the machine is in use, in order to cool off the cover before placing another matrix in the drier.

The shaft 4 extends beyond one side of the frame member 3 and is provided with an arm 30 adapted to bear against the switch plate 31ª of an electric switch 31 in the circuit of the heating elements or coils g.

The plate 31ª is normally positioned by the spring-controlled button 31ᵇ, so that when the arm 30 bears against the plate 31ª the switch will be closed, and when the arm 30 is moved away from the plate 31ª, the switch button will be released and the switch opened. The wiring connecting the switch 31 with the coils g is not shown. This can be arranged as convenient. By this construction, as the shaft 4 is rotated in one direction, the switch will be opened and closed when it is rotated in the other direction.

Clips 25ª are provided on the lower edge of the interior perforated wall 25 of the cover, under which clips the lower edge of a matrix 35 is inserted, as shown in Fig. 6.

The operation of our combined matrix former and drier is as follows:

The vacuum pump 29 is started and is permitted to run continuously during the operation of the machine in order to cool the cover 2 when opened.

When the operating levers 5 are lifted to open the cover the electric current is simultaneously shut off from the heating elements or coils g.

A matrix 35 still more or less moist and of approximately the same dimensions as the interior wall 25 of the cover 2 is inserted by its lower edge under the clips 25ª, adjacent the lower edge of the cover, and the matrix is immediately drawn and held against the said interior wall 25 of the cover by the vacuum created in the hollow of the latter; the perforations in said interior wall being closed by the matrix, thus rendering the vacuum creating means effective.

The cover is then closed by drawing the operating handle 6 forward, which rotates the shaft 4 which carries the cover. In such movement of the operating handle 6 it is still locked by the latch dog 7 to the cover.

The latch dog 7 is then released from the catch 8 and the handle 6 is moved farther downward. This movement rotates the shaft 4, which brings the arm 20 down on the cam-arm 22 and forces it downward, which rotates the rod 21 and moves the cam arms 22, 22ª upward against the cam-roller j' on the rod j, lifting the latter. This lifts the angular arm i, and causes the pressure arms h, h, to be moved outwardly, in so doing bringing the coil springs k to bear on the perimeter margins of the matrix, and thus hold these margins securely against the interior perforated wall of the cover, so that the air will not tend to leak under the edges of the matrix.

Since the cover is seated before the pressure arms h are thrown into action any tendency of the springs k to catch on the edges of the matrix, during the closing of the cover, is prevented. And, when the cover is opened again the pressure arms h are first retracted from the margins of the matrix, so as to move the springs k away from the matrix.

Simultaneously, as the operating levers 5 are brought into their lowermost position, the arm 30 on the end of the shaft 4 is brought against the switch plate 31ª, thus closing the switch 31 and turning on the electricity to heat the coils g.

By employing open coil-springs the force of the vacuum may act on the margins of the matrix as effectively as on its central portions, and the heat also may pass through the springs to the margins of the matrix, and ensure the drying of these margins. During the drying of the matrix it will shrink more or less, and the springs k, being laterally flexible, move with the margins of the matrix and thus permit the latter to shrink.

The matrix is allowed to remain in the machine from one to two minutes, depending on its moisture content, and the amount of heat employed.

The operating levers 5 are then raised until the latch dog 7 engages the catch 8 and this preliminary movement of the operating levers permits the angular arms $i$ and the rod $j$ to lower, which retracts the pressure-arms $h$, thereby withdrawing the springs $k$ from the edges of the matrix, and at the same time the switch 31 is opened to turn off the current to the heating coils $g$. The lifting of the operating levers is then continued until the cover 2 is entirely open, and rests against the supports 36, fixed to the rear of the frame. The matrix may then be removed and will be found dried and formed without buckles or warps.

Furthermore, by reason of the springs $k$, carried by the pressure-arms $h$, yielding laterally to the pull of the matrix in shrinking—provided not too great a vacuum be applied—the described construction accommodates a greater degree of shrinkage of the matrix than was obtainable in former driers, and thus a smaller stereotype plate may be cast, and less paper used in printing. On the other hand, by increasing the vacuum, and the tension adjustment of the coiled springs $k$, and raising the temperature of heating coils $g$, the matrix can be held so firmly against the interior wall of the cover as to resist shrinkage. This result is desirable in the making of a matrix for color printing.

Referring to Fig. 9 we have illustrated that pads of wadded steel wool, 40, may be substituted on the pressure arms in place of coil springs $k$. The steel wool pads could be wired in place on the pressure arms; and these pads being more or less porous permit the heat to pass through; they also are sufficiently yielding to permit the matrix to shrink.

When gas is to be used as the heating medium, then it is necessary that the perimeter margins of the matrix be sealed against the interior perforated wall of the cover; and to accomplish such sealing, efficiently, we prefer to place a thin plate, as shown by 50 in Fig. 10, on the pressure arms $h$, $h$, and place on the plate a pad $40^a$ of wadded steel wool, with the perimeter margins of the pad built up to insure the sealing of the perimeter margins of the matrix.

Instead of holding the matrix against the interior wall of the cover by vacuum, the same result may be obtained by building up a holding pressure against the front of the matrix.

When this type of construction is to be used, our drier could be built as diagrammatically illustrated in Fig. 11.

51 represents a rectangular base composed of bottom and sides, on which a cover 52 is mounted. One side of the cover may be hinged to the base 51 as shown at 58. The cover is perforated as indicated by 57 to permit the moisture in the matrix to escape. The base and cover are provided with companion seating flanges, as 53 and 54, and the cover is secured in place by clamps 55. In order to insure a seal around the margins of the cover a gasket is placed between the flanges 53, 54, as indicated by the heavy line 56.

The base is provided with flexible conduit 59, which is assumed to be connected with a suitable air-compressing device, not shown. Within the cover, at the front and back edges, are provided clips similar to those represented by $25^a$ in Fig. 6, and serving to hold the matrix in place in the cover. Also heating means are provided within the cover, for example, electrically heated coils, represented by 60 in Fig. 11. Other details of construction of this modification may be similar to, or adapted from the construction above described with respect to the other types of our drier,

We claim:

1. In the drying of a matrix, the method of preventing warping and buckling consisting in holding the matrix firmly, by a vacuum, against a firm, true surface during the drying period, and holding the perimeter margins of the matrix against said surface by applying resilient mechanical pressure to said margins.

2. The method of drying a matrix, consisting in holding the matrix firmly by a vacuum against a firm, true surface during the drying period, sealing the perimeter margins of the matrix against said surface by applying resilient mechanical pressure to said margins, and applying heat to the matrix in cooperation with said vacuum to effect the drying thereof.

3. A combined matrix former and drier comprising an oven-body composed of a base, and a cover, means for creating fluid pressure within the oven whereby to hold the matrix firmly against the interior face of the cover, and means for heating the interior of said oven-body.

4. A combined matrix former and drier comprising an oven-body composed of a base and a cover, means for creating fluid pressure within the oven whereby to hold the matrix firmly against the interior face of the cover, means for opening and closing the cover, a heating element within said oven-body, means for turning said heating element on and off, such means operably connected with said cover-opening and closing means, and so arranged that the heat is turned on after the cover is closed, and is turned off in advance of the opening of the cover.

5. A combined matrix former and drier comprising an oven-body and a cover therefor curved to the desired contour of the matrix, means for creating fluid pressure, whereby to hold the matrix firmly against the interior face of the cover, and a heating element supported within said oven-body and movable towards and from the interior face of the cover.

6. A combined matrix former and drier comprising an oven-body including a cover curved to the desired contour of the matrix, means for creating fluid pressure within the oven whereby to hold the matrix firmly against the interior face of the cover, and means for applying resilient pressure against operable pressure-arms, provided adjacent opposite side of the perimeter margins of the matrix to hold the same against the interior face of the cover independently of said fluid pressure.

7. A combined matrix former and drier comprising an oven-body including a cover, means for creating fluid pressure within the oven whereby to hold the matrix firmly against the interior face of the cover, operable pressure-arms provided adjacent opposite side of the cover, means for moving said pressure-arms against and from the interior wall of the cover.

8. A combined matrix former and drier comprising an oven-body including a hollow cover, the interior wall of said cover being perforated, and said cover adapted to be connected with vacuum creating means, and operable means adapted to hold only the perimeter margins of the matrix in sealing contact with the interior wall of the cover.

9. A combined matrix former and drier comprising an oven-body including a hollow cover, the interior wall of said cover being perforated, and said cover adapted to be connected with vacuum creating means, and operable means for holding the perimeter margins of the matrix in sealing contact with the interior wall of the cover, said holding means adapted to accomodate the shrinking of the matrix.

10. A combined matrix former and drier comprising an oven-body including a hollow cover, the interior wall of said cover being perforated, and said cover adapted to be connected with vacuum creating means, operable pressure-arms provided adjacent opposite side of the cover and means for moving said pressure-arms against and from the interior wall of the cover.

11. In a combined matrix former and drier an oven-body including a hollow cover, the interior wall of said cover being perforated and said cover adapted to be connected with vacuum creating means, operable pressure-arms provided adjacent opposite side of the cover, means for moving said pressure-arms against and from the interior wall of the cover, and resilient pressure exerting elements carried by said arms.

12. In a combined matrix former and drier, an oven-body including a hollow cover, means for creating fluid pressure within the oven whereby to hold the matrix firmly against the interior face of the cover, operable pressure-arms provided adjacent opposite side of the cover, resilient pressure exerting elements provided adjacent the sides of the cover, means for opening and closing the cover and other means operably connected with said cover-operating means for moving said pressure-arms as mentioned.

13. In a combined matrix former and drier, an oven-body including a hollow cover, means for creating fluid pressure with the oven whereby to hold the matrix firmly against the interior face of the cover, operable pressure-arms provided adjacent opposite side of the cover, resilient pressure exerting elements carried by said pressure arms, means for opening and closing the cover, a heating element within said oven-body, and means for turning said heating element on and off, such means operably connected with said cover opening and closing means, and whereby the heat is turned on after the cover is closed, and is turned off in advance of the opening of the cover.

14. In a combined matrix former and drier, an oven-body including a hollow cover, the interior wall of said cover being perforated, and said cover adapted to be connected with vacuum creating means, operable pressure-arms provided adjacent opposite side of the cover, resilient pressure exerting elements carried by said pressure arms, means for opening and closing the cover, other means operably connected with said cover-operating means for moving said pressure-arms as mentioned, an electric heating element within said oven-body, a switch in the electric circuit of said heating element, such switch also operably connected with said cover opening and closing means, and whereby the pressure arms are operated and heat is turned on and off relatively to the opening and closing of the cover.

15. In the drying of a matrix, the method of preventing warping and buckling thereof, which consists in holding the matrix firmly by pneumatic pressure during the drying period against a firm true surface, restricting said pressure to less than would break down the spaces of the mat, applying heat to the matrix in cooperation with said pressure to effect the drying, and permitting the vapors incidental to the drying of the mat to escape.

ALBERT W. COCHRAN.
HENRY W. DEWEY.